United States Patent
Kuwabara

(10) Patent No.: US 8,476,597 B2
(45) Date of Patent: Jul. 2, 2013

(54) RADIATION IMAGE DETECTING DEVICE AND CONTROL METHOD THEREOF

(75) Inventor: Takeshi Kuwabara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 13/304,089

(22) Filed: Nov. 23, 2011

(65) Prior Publication Data

US 2012/0132821 A1 May 31, 2012

(30) Foreign Application Priority Data

Nov. 26, 2010 (JP) ................................. 2010-263539

(51) Int. Cl.
*G01T 1/24* (2006.01)

(52) U.S. Cl.
USPC .............. 250/370.08; 250/370.09; 250/371; 378/98.8

(58) Field of Classification Search
USPC .................................................. 250/370.08
See application file for complete search history.

(56) References Cited

U.S. PATENT DOCUMENTS

| | | | | |
|---|---|---|---|---|
| 6,404,854 B1 * | 6/2002 | Carroll et al. | ................ | 378/98.8 |
| 6,797,960 B1 | 9/2004 | Spartiotis et al. | | |
| 2003/0002624 A1 * | 1/2003 | Rinaldi et al. | ................ | 378/98.8 |
| 2004/0228452 A1 * | 11/2004 | Rinaldi et al. | ................. | 378/207 |
| 2004/0258204 A1 * | 12/2004 | Nokita et al. | .................... | 378/91 |
| 2010/0061507 A1 * | 3/2010 | Fujii | ............................... | 378/28 |

FOREIGN PATENT DOCUMENTS

| | | |
|---|---|---|
| JP | 2006-246961 A | 9/2006 |
| JP | 2008-132216 A | 6/2008 |
| JP | 2009-195612 A | 9/2009 |
| JP | 2009-201561 A | 9/2009 |
| JP | 2010-121944 A | 6/2010 |

OTHER PUBLICATIONS

Notification of Reasons for Refusal, dated Oct. 24, 2012, issued in corresponding JP Application No. 2010-263539, 5 pages in English and Japanese.

* cited by examiner

*Primary Examiner* — Marcus Taningco
(74) *Attorney, Agent, or Firm* — Sughrue Mion, PLLC

(57) ABSTRACT

When all TFTs are turned on, an electric signal is compared with a first threshold value. If the electric signal is equal to or more than the first threshold value, a first judgment unit judges that X-ray irradiation has been started. A second judgment unit compares second and third threshold values with a first-order differentiation value of an electric signal that is outputted in a state of turning off all the TFTs. If the first-order differentiation value is within or out of a range defined by the second and third threshold values throughout a verification period, the second judgment unit verifies that the judgment of the first judgment unit is correct. When the judgment of the first judgment unit is verified to be correct, the TFTs are kept turned off, and an FPD continuously carries out charge accumulation operation for capturing an X-ray image.

11 Claims, 8 Drawing Sheets

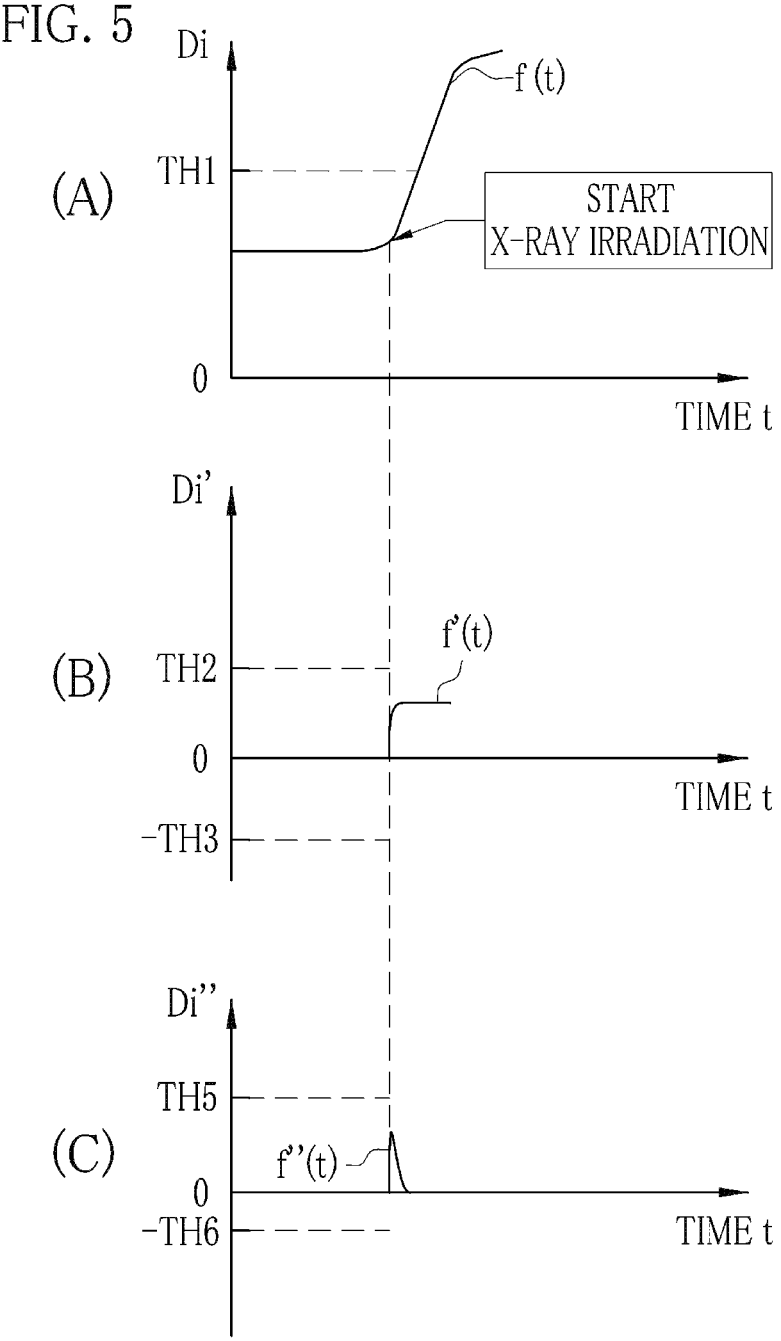

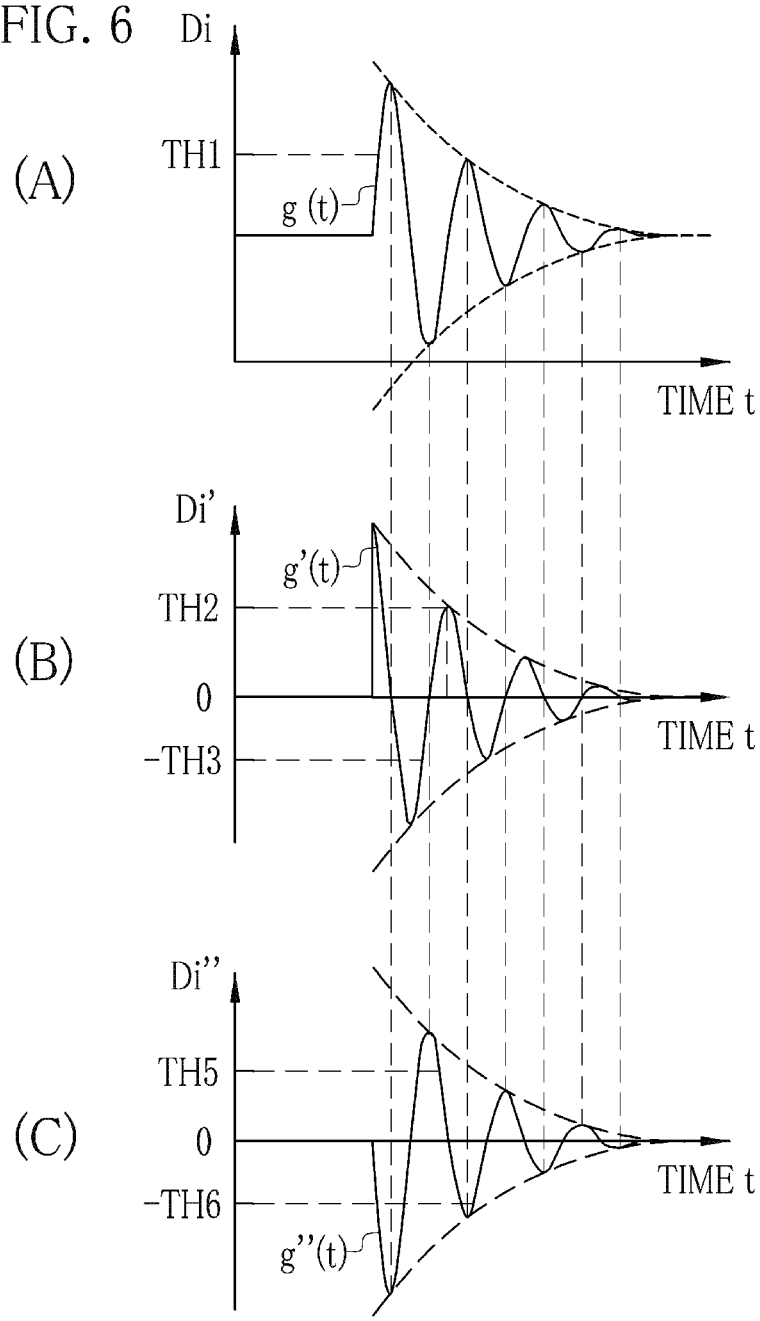

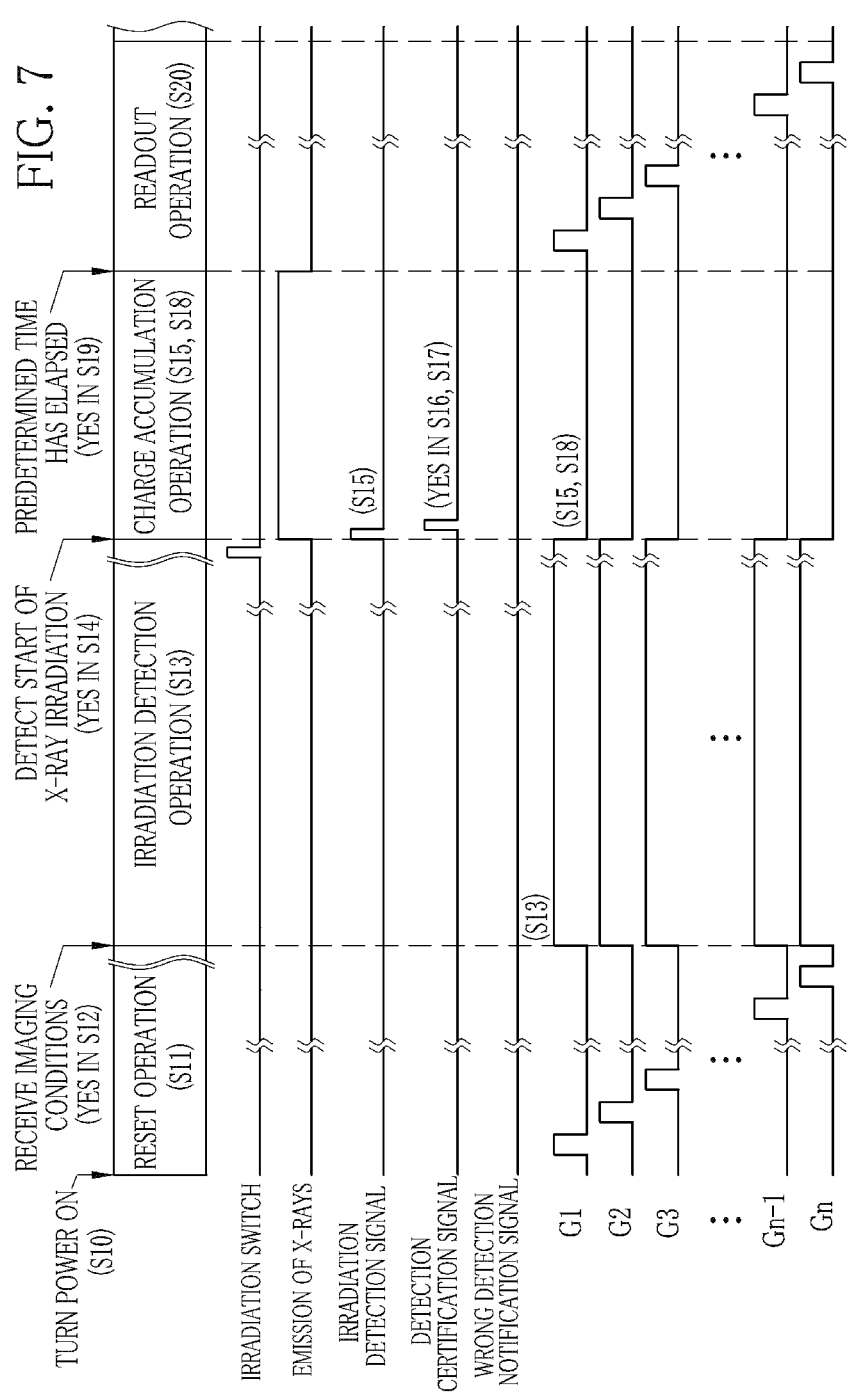

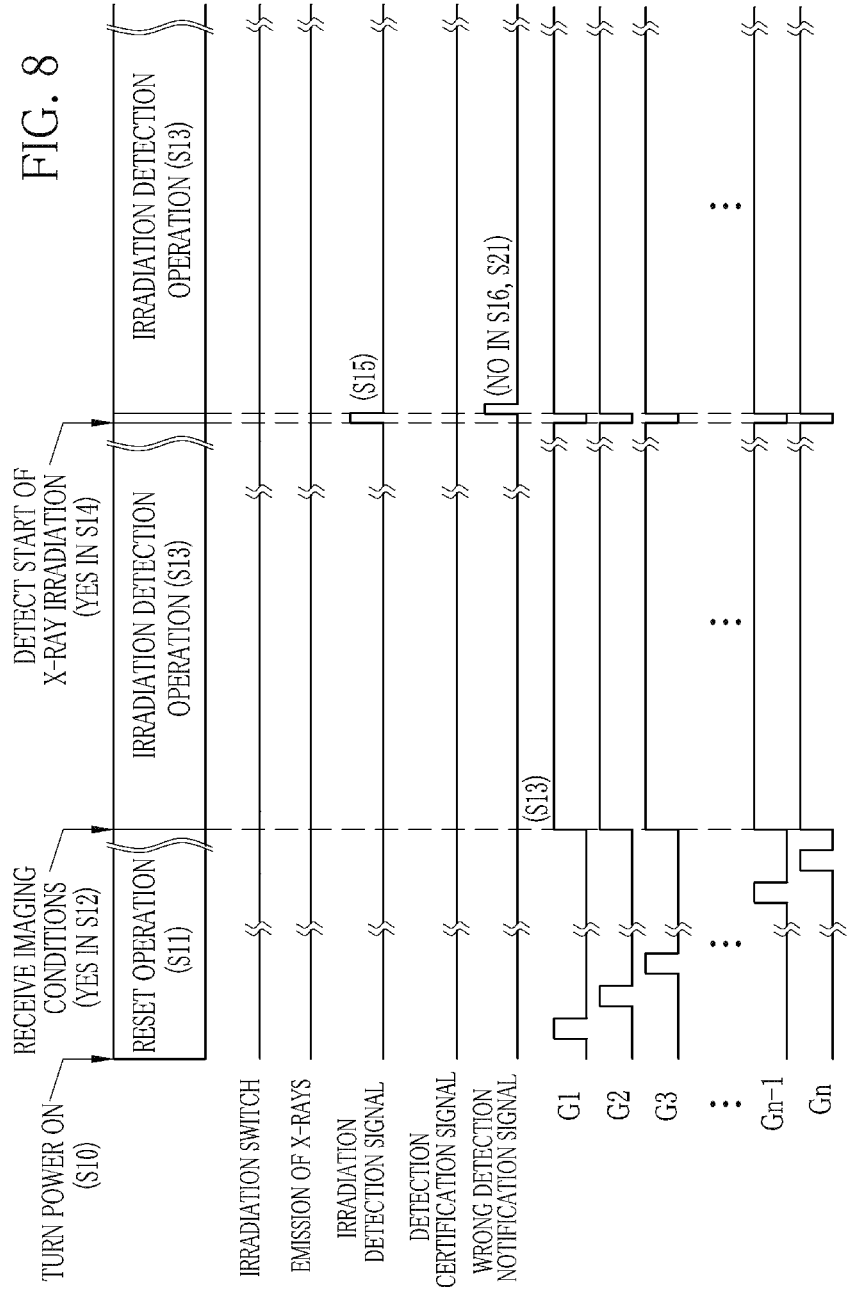

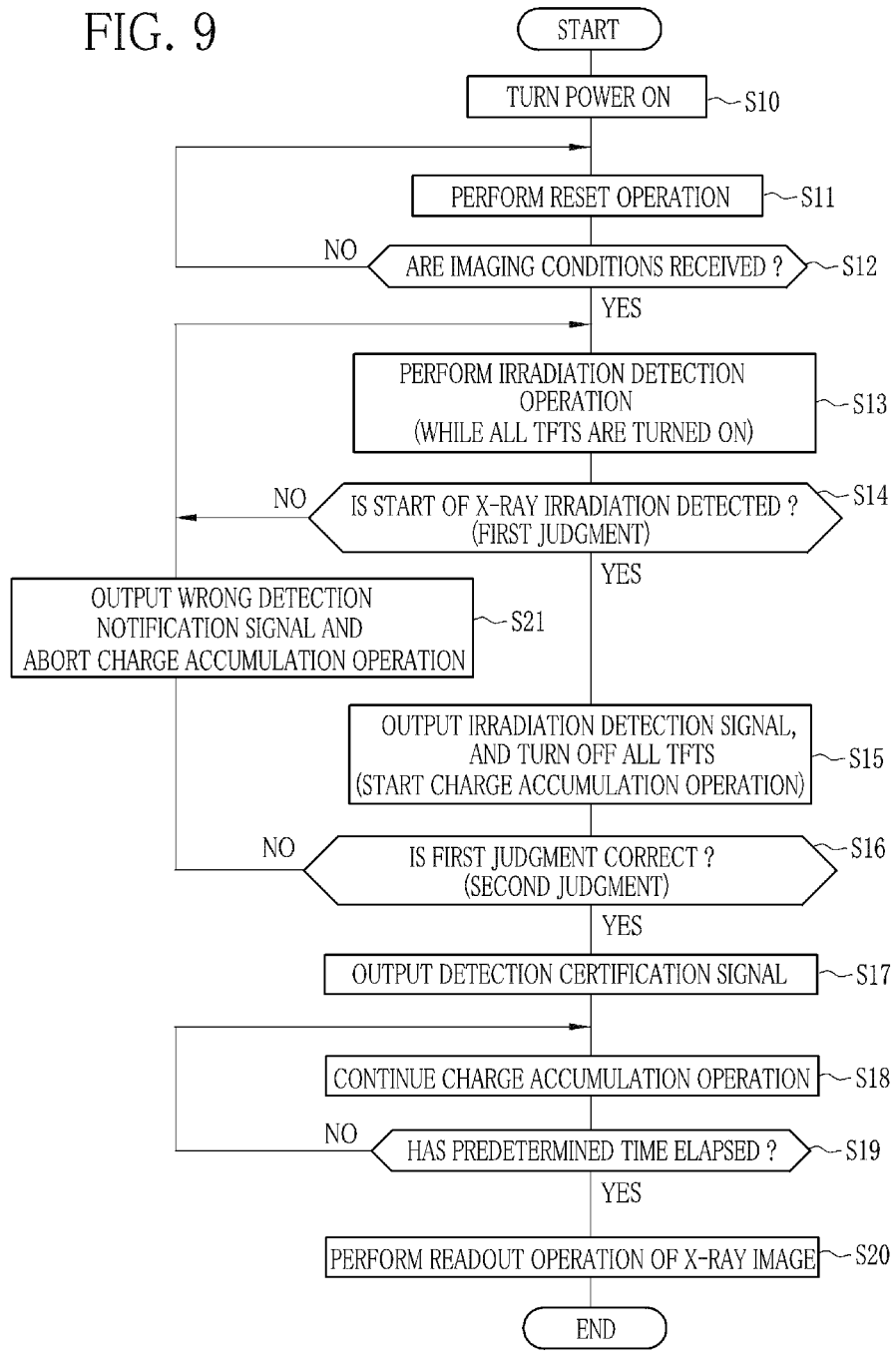

RADIATION IMAGE DETECTING DEVICE AND CONTROL METHOD THEREOF

BACKGROUND OF THE INVENTION

1. Field of the Invention

The present invention relates to a radiation image detecting device and a control method thereof.

2. Description Related to the Prior Art

A radiation imaging system, for example, an X-ray imaging system is constituted of an X-ray generation device and an X-ray imaging device. The X-ray generation device includes an X-ray source for applying X-rays to a patient's body, a source control unit for controlling the operation of the X-ray source, and an irradiation switch for inputting an X-ray irradiation start command. The X-ray imaging device includes an X-ray image detecting device for detecting an X-ray image in response to the X-rays transmitted through a patient's body part to be imaged, and an imaging control unit for controlling the operation of the X-ray image detecting device.

In the X-ray image detecting device, a flat panel detector (FPD) becomes widespread recently as an X-ray detector, instead of an X-ray film or an imaging plate (IP). The FPD has a matrix of pixels, and each pixel accumulates signal charge the amount of which depends on the amount of the X-rays incident thereon. The FPD detects an X-ray image, which represents image information of the patient's body part to be imaged, by accumulating the signal charge on a pixel-by-pixel basis, and outputs the X-ray image as digital image data.

There is practically used a portable X-ray image detecting device (hereinafter called electronic cassette) that has the FPD contained in a rectangular parallelepiped case. The electronic cassette is attachable to an imaging support designed for a film cassette or an IP cassette when used, besides being put on a bed or hand-held by a patient himself/herself. The electronic cassette is sometimes taken out from a hospital to the bedside of a home-care patient, an accident scene, or a natural disaster scene to perform radiography there without using the imaging support.

Conventionally, an operation signal generated from the irradiation switch is sent to both the source control unit of the X-ray generation device and the imaging control unit of the X-ray imaging device as a synchronization signal for indicating the start of X-ray irradiation. This allows the synchronization between the start of X-ray emission from the X-ray source and the start of signal charge accumulation in the X-ray image detecting device. To send the synchronization signal, the X-ray generation device and the X-ray imaging device have to be electrically connected to each other. If the X-ray generation device and the X-ray imaging device are manufactured by different makers and have incompatible connection interfaces (specifications of a cable or connector, format of the synchronization signal, or the like), it is necessary to newly prepare another interface compatible therebetween.

To solve this problem, there is proposed a technique in which the X-ray image detecting device detects the start of X-ray irradiation by itself for synchronization with the X-ray generation device without receiving the synchronization signal, in other words, without the electrical connection between the X-ray generation device and the X-ray imaging device (refer to U.S. Pat. No. 6,797,960 corresponding to Japanese Unexamined Patent Application Publication No. 2002-543684). According to this technique, bias current of the FPD, that is, an output value of a non-detection area of the FPD on which the X-rays not-transmitted through the patient's body part are incident is detected. Then, a differential value of the bias current is compared to a threshold value, to detect the start of X-ray irradiation.

Generally speaking, an output of an electrical component is susceptible to noise due to an internal factor of the electrical component itself or an external factor such as an ambient environment. Of course, the X-ray image detecting device equipped with a lot of electrical components is no exception. In the X-ray image detecting device, noise occurs by slight impact or vibration when the patient or a radiological technician unintentionally bumps thereon, for example. Such noise causes the X-ray image detecting device to malfunction. If a signal for detecting the start of X-ray irradiation has such noise, the X-ray image detecting device possibly makes a wrong detection of the start of X-ray irradiation, in spite of the fact that the X-ray image detecting device is not irradiated with the X-rays. The wrong detection makes the X-ray image detecting device execute unnecessary operation, and wastes power consumption. In addition, the radiological technician and patient need to wait for the termination of operation, and possibly miss a perfect shooting opportunity.

Worse yet, devices connected to the X-ray image detecting device, including the imaging control unit and a console used for a setup of imaging conditions, sometimes operate in response to the wrong detection, as if radiography has been actually carried out. In this case, burdensome operation e.g. reset of the imaging conditions is required, and affects a workflow of the radiological technician. Also, the risk of medical malpractice arises such that an inappropriate image obtained by the malfunction of the X-ray image detecting device may be transferred to a radiologist, or a setting error of the imaging conditions causes the patients to mix up.

A method described in the U.S. Pat. No. 6,797,960 is sensitive to the noise, because the bias current of the FPD is detected. When the bias current fluctuates by the noise, the X-ray image detecting device possibly makes the wrong detection of the start of X-ray irradiation. In spite of this fact, the U.S. Pat. No. 6,797,960 does not describe measures against the wrong detection due to the noise.

SUMMARY OF THE INVENTION

An object of the present invention is to provide a radiation image detecting device that can certainly prevent a wrong detection of the start of radiation irradiation.

To achieve the above and other objects of the present invention, a radiation image detecting device includes a radiation image detector, a first judgment unit, a second judgment unit, and a control section. The radiation image detector has a plurality of pixels. Each pixel accumulates signal charge by an amount corresponding to an amount of radiation incident from a radiation source. Each pixel is provided with a switching element for outputting the signal charge. The outputted signal charge is converted into an electric signal. The first judgment unit judges whether or not radiation irradiation has been started based on variation of the electric signal. The variation is detected by comparing the electric signal from at least one of the pixels with a first threshold value at predetermined time intervals. The second judgment unit verifies whether or not the variation of the electric signal is actually caused by the radiation irradiation based on fluctuation of the electric signal with time after the first judgment unit judges that the radiation irradiation has been started, to verify whether or not the judgment of the first judgment unit is correct. The control section controls operation of the radiation image detector in accordance with a judgment result of the first judgment unit and a verification result of the second judgment unit.

The control section preferably starts charge accumulation operation of the radiation image detector, after the first judgment unit judges that the radiation irradiation has been started. If the second judgment unit verifies that the judgment of the first judgment unit is correct, the control section preferably continues the charge accumulation operation of the radiation image detector. If the second judgment unit verifies that the judgment of the first judgment unit is incorrect, the control section preferably interrupts the charge accumulation operation of the radiation image detector, and restarts the judgment of the first judgment unit.

During the judgment of the first judgment unit, the control section preferably turns on all of the switching elements. When the first judgment unit judges that the radiation irradiation has been started, the control section preferably turns off all of the switching elements, and the second judgment unit carries out the verification based on leak charge leaking from the pixel in an off state.

The second judgment unit preferably compares the electric signal with a second threshold value several times during a predetermined period after the first judgment unit judges that the radiation irradiation has been started, and makes a verification based on a comparison result.

The second judgment unit may have a differentiating circuit, and make the verification based on a result of comparison between a differentiation value of the electric signal and the second threshold value. In another case, the second judgment unit may make the verification based on a result of comparing a ratio between the electric signal and the differentiation value of the electric signal with the second threshold value. The differentiating circuit may perform first-order or second-order differentiation of the electric signal.

The first and second judgment units preferably use the electric signal outputted from the pixel in a middle of the radiation image detector for the judgment and the verification. The radiation image detecting device is preferably an electric cassette having the radiation image detector contained in a case.

A control method of a radiation image detecting device includes the steps of judging whether or not radiation irradiation has been started by a first judgment unit based on variation of the electric signal, the variation being detected by comparing the electric signal from at least one of the pixels with a first threshold value at predetermined time intervals; if the first judgment unit judges that the radiation irradiation has been started, starting charge accumulation operation of the radiation image detector; verifying whether or not the variation of the electric signal is actually caused by the radiation irradiation by a second judgment unit based on fluctuation of the electric signal with time after the first judgment unit judges that the radiation irradiation has been started, to verify whether or not the judgment of the first judgment unit is correct; if the second judgment unit verifies that the judgment of the first judgment unit is correct, continuing the charge accumulation operation of the radiation image detector; and if the second judgment unit verifies that the judgment of the first judgment unit is incorrect, interrupting the charge accumulation operation of the radiation image detector, and restarting the judgment of the first judgment unit.

According to the present invention, when the radiation irradiation is detected, whether or not the detection is caused by noise is verified based on the fluctuation of the electric signal with time. Thus, it is possible to certainly prevent the wrong detection due to the noise, which is easily misidentified as the start of radiation irradiation.

BRIEF DESCRIPTION OF THE DRAWINGS

For more complete understanding of the present invention, and the advantage thereof, reference is now made to the following descriptions taken in conjunction with the accompanying drawings, in which:

FIG. 5 is a graph showing variation of a voltage signal Di, a first-order differential value Di', and a second-order differential value Di" with time, when the FPD is actually irradiated with X-rays;

FIG. 6 is a graph showing variation of the voltage signal Di, the first-order differential value Di', and the second-order differential value Di" with time, when vibration noise arises;

FIG. 7 is a timing chart of an electronic cassette, and shows a state where the start of X-ray irradiation is detected;

FIG. 8 is a timing chart of the electronic cassette, and shows a state where the vibration noise arises; and FIG. 9 is a flowchart showing an operation procedure of the electronic cassette.

DESCRIPTION OF THE PREFERRED EMBODIMENTS

Figure 1:
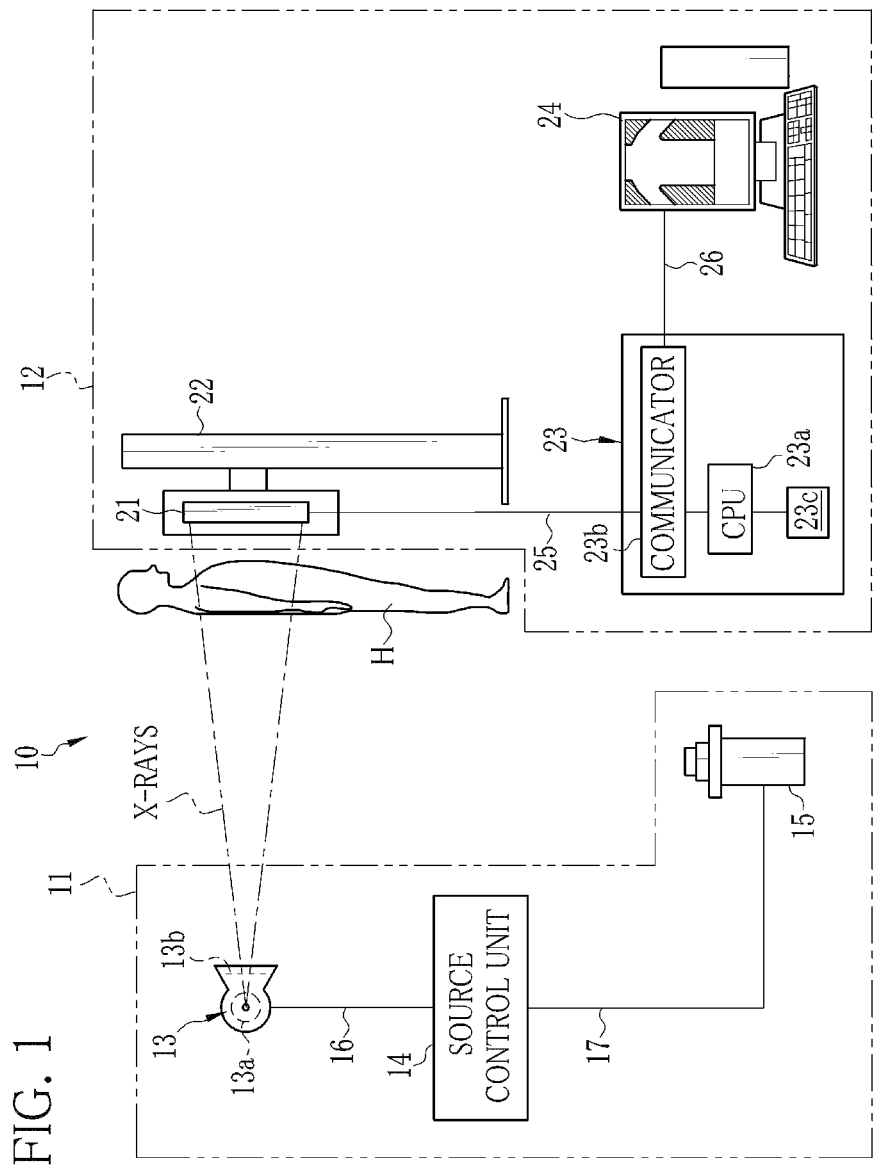
FIG. 1 is a schematic view of an X-ray imaging system.

As shown in FIG. 1, an X-ray imaging system 10 is constituted of an X-ray generation device 11 and an X-ray imaging device 12. The X-ray generation device 11 includes an X-ray source 13, a source control unit 14 for controlling the operation of the X-ray source 13, and an irradiation switch 15. The X-ray source 13 has an X-ray tube 13a for emitting X-rays, and a collimator 13b for limiting an irradiation filed of the X-rays emitted from the X-ray tube 13a.

The X-ray tube 13a has a cathode and an anode. The cathode is composed of a filament for emitting thermoelectrons. The thermoelectrons emitted from the cathode collide against the anode (target) and produce the X-rays. The target, having the shape of a disc, is a rotating anode in which an X-ray focus moves along a circumferential orbit by its rotation to prevent the elevation in the temperature of the X-ray focus. The collimator 13b has plural lead plates for blocking the X-rays. The lead plates are arranged into the shape of a number sign "#" with leaving an irradiation opening in the middle to transmit the X-rays therethrough. Moving the lead plates changes the size of the irradiation opening, and regulates the irradiation field.

The source control unit 14 includes a high voltage generator and a controller. The high voltage generator supplies high voltage to the X-ray source 13. The controller controls tube voltage for determining an energy spectrum of the X-rays emitted from the X-ray source 13, tube current for determining an X-ray irradiation amount per unit of time, and an X-ray irradiation time. The high voltage generator multiplies input voltage by a transformer to generate the high tube voltage, and supplies the X-ray source 13 with drive power through a high voltage cable 16. The X-ray generation device 11 according to this embodiment does not have the function of communicating with the X-ray imaging device 12. Imaging conditions including the tube voltage, the tube current, and the X-ray irradiation time are manually set up by a radiological technician on an operation panel of the source control unit 14.

The irradiation switch 15 to be operated by the radiological technician is connected to the source control unit 14 through a signal cable 17. The irradiation switch 15 is a two-step push switch. Upon a first-step push of the irradiation switch 15, a warm-up start signal for starting warm-up operation of the X-ray source 13 is generated. Upon a second-step push of the irradiation switch 15, an irradiation start signal is generated to make the X-ray source 13 start applying the X-rays. These signals are inputted to the source control unit 14 through the signal cable 17.

The source control unit 14 controls the operation of the X-ray source 13 based on the control signals from the irradiation switch 15. In receiving the warm-up start signal, the source control unit 14 actuates a heater to preheat the filament, and starts rotating the target at a desired rotational speed. Time required for the warm-up operation is on the order of 200 to 1500 msec. The radiological technician inputs a warm-up start command by the first-step push of the irradiation switch 15, and then, after a lapse of time required for the warm-up, inputs an irradiation start command by the second-step push of the irradiation switch 15.

In receiving the irradiation start signal, the source control unit 14 starts applying the X-ray source 13 with the electric power, and starts measuring the X-ray irradiation time using a timer. When the measured X-ray irradiation time reaches a value set up as the imaging conditions, the source control unit 14 stops the X-ray irradiation. Although the X-ray irradiation time depends on the imaging conditions, the maximum X-ray irradiation time is on the order to 500 msec to 2 sec inmost cases in capturing a static radiographic image. The X-ray irradiation time is determined within the limit of this maximum.

The X-ray imaging device 12 is constituted of an electronic cassette (radiation image detecting device) 21, an imaging support 22, an imaging control unit 23, and a console 24. The electronic cassette 21 includes an FPD (radiation image detector; see FIG. 2) 36 and a portable case for containing the FPD 36. The electronic cassette 21 receives the X-rays that are applied from the X-ray source 13 and transmitted through a body part to be imaged of a patient H, and outputs an X-ray image. The electronic cassette 21 is in rectangular and flat shape. A surface of the electronic cassette 21 is approximately the same size as those of a film cassette and an IP cassette.

The imaging support 22 has slots into which the electronic cassette 21 is detachably attached. The imaging support 22 holds the electronic cassette 21 in such a position that an incident surface of the electronic cassette 21 on which the X-rays are incident is opposed to the X-ray source 13. Since the case of the electronic cassette 21 is approximately the same size as those of the film cassette and the IP cassette, the electronic cassette 21 is attachable to another imaging support designed for the film cassette or the IP cassette. Note that, FIG. 1 shows the upright imaging support 22 for imaging the patient H in a standing position, by way of example. However, the imaging support may be a horizontal imaging support for imaging the patient in a lying position.

Figure 2:
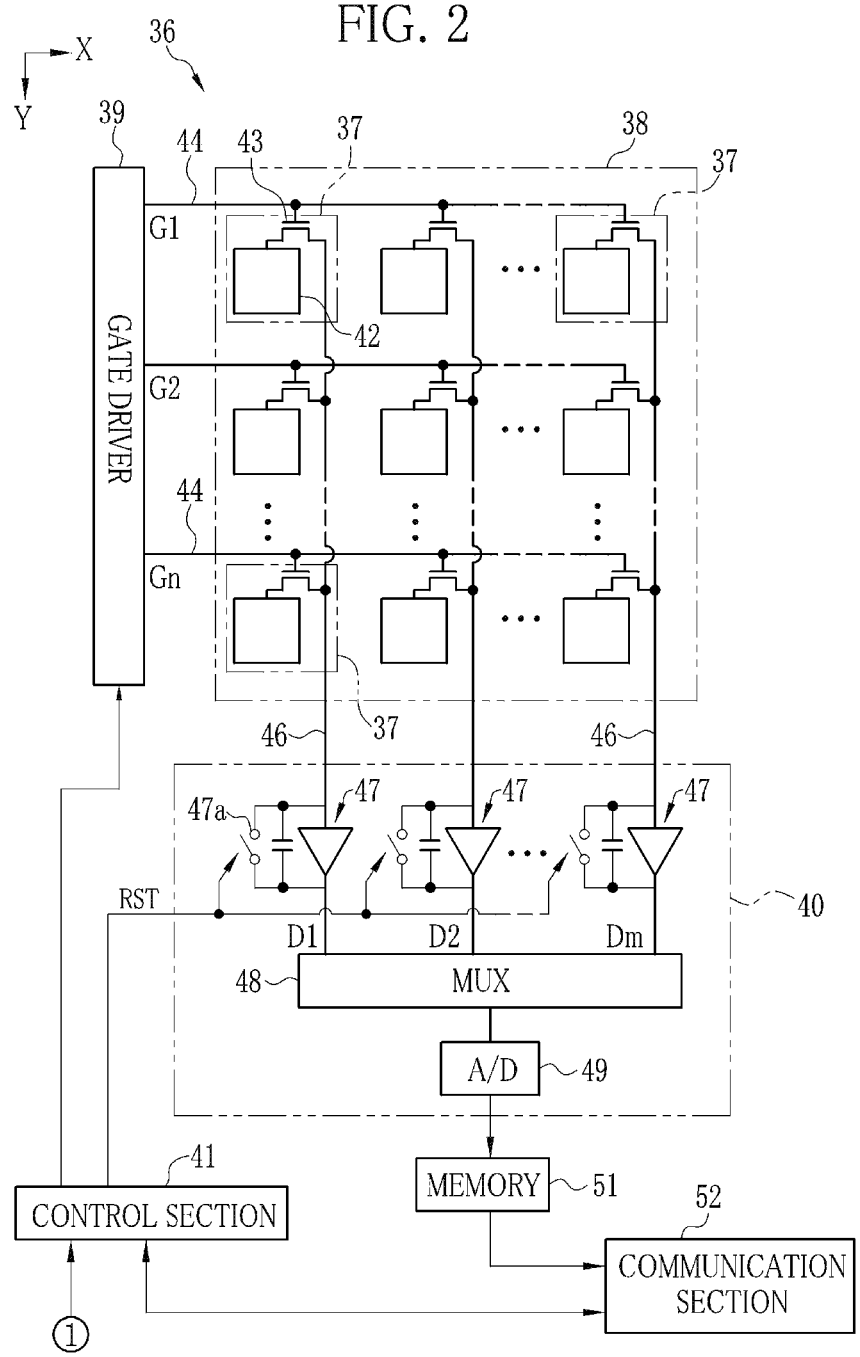
FIG. 2 is a schematic circuit diagram of an FPD.

As shown in FIG. 2, the FPD 36 is provided with an imaging area 38, a gate driver 39, a signal processing section 40, and a control section (control means) 41 that are formed on a TFT active matrix substrate. The imaging area 38 has plural pixels 37, and each pixel accumulates signal charge the amount of which corresponds to the amount of the X-rays incident thereon. The gate driver 39 drives the pixels 37, and controls readout of the signal charge. The signal processing section 40 converts the read signal charge into digital data. The control section 41 controls the operation of the FPD 36 via the gate driver 39 and the signal processing section 40.

The plural pixels 37 are arranged in a two-dimensional matrix with n rows (in x direction) and m columns (in y direction) at a predetermined pitch.

The FPD 36 is of an indirect conversion type, in which a scintillator (phosphor) converts the X-rays into visible light, and the pixels 37 photoelectrically convert the visible light into the electric charge. The scintillator is disposed so as to face the whole surface of the imaging area 38 having the pixels 37. Note that, a direct conversion type of FPD may be used instead. In the direct conversion type of FPD, the X-rays are directly converted into the electric charge using a conversion layer (amorphous selenium or the like).

Each pixel 37 is provided with a photodiode 42 being a photoelectric conversion element that generates the electric charge (pairs of a negative electron and a positive hole) in response to the visible light incident thereon, a capacitor (not shown) for accumulating the electric charge generated by the photodiode 42, and a thin film transistor (TFT) 43 being a switching element.

The photodiode 42 has a semiconductor layer (PIN type, for example) for generating the electric charge, and upper and lower electrodes disposed on and under the semiconductor layer, respectively. The lower electrode of the photodiode 42 is connected to the TFT 43, and the upper electrode thereof is connected to a not-shown bias line through which bias voltage is applied. The application of the bias voltage produces an electric field in the semiconductor layer. Thus, the negative electrons are attracted to one of the upper and lower electrodes of positive polarity, and the positive holes are attracted to the other one of negative polarity. Thereby, the electric charge is accumulated in the capacitor.

A gate electrode of the TFT 43 is connected to the scan line 44. A source electrode of the TFT 43 is connected to the signal line 46, and a drain electrode thereof is connected to the photodiode 42. The scan lines 44 and the signal lines 46 are laid out into a lattice. The number of the scan lines 44 corresponds with the number (n) of the rows of the pixels 37 in the imaging area 38, and the number of the signal lines 46 corresponds with the number (m) of the columns of the pixels 37. The scan lines 44 are connected to the gate driver 39, and the signal lines 46 are connected to the signal processing section 40.

By driving the TFTs 43, the gate driver 39 makes the FPD 36 carry out charge accumulation operation in which the pixels 37 accumulate the signal charge by an amount corresponding to the amount of the incident X-rays, readout operation for reading out the signal charge from the pixels 37, reset operation, and irradiation detection operation. The control section 41 controls the start timing of each operation based on a control signal sent from the imaging control unit 23 through a communication section 52.

Figure 3:
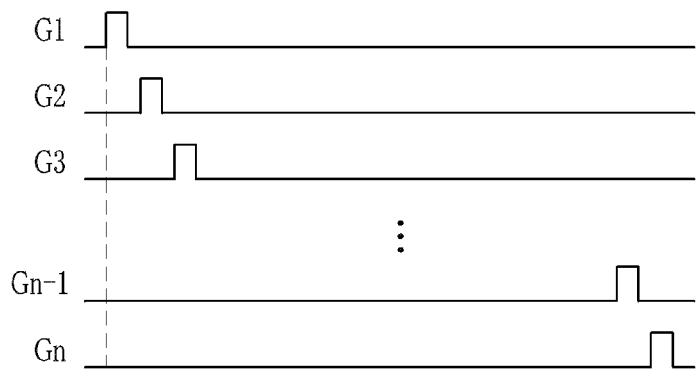
FIG. 3 is a timing chart showing an on/off state of gate pulses during reset operation and readout operation.

In the charge accumulation operation, while the TFTs 43 are turned off, the signal charge is accumulated in the pixels 37. In the readout operation, as shown in FIG. 3, the gate driver 39 successively issues gate pulses G1 to Gn for driving the TFTs 43 on a row-by-row basis. In response to the gate pulses G1 to Gn, the scan lines 44 are activated on a one-by-one basis to turn on the TFTs 43 connected to the scan lines 44 on a row-by-row basis. When the TFT 43 is turned on, the electric charge accumulated in the capacitor of the pixel 37 is read out to the signal line 46, and is inputted to the signal processing section 40.

Dark current (dark charge) occurs in the semiconductor layer of the photodiode 42, regardless of the presence or absence of the incident X-rays. The dark charge is accumulated in the capacitor because of application of the bias voltage. The dark charge occurring in the pixels 37 becomes noise of the image data. Thus, the reset operation is carried out to remove the noise. In other words, the reset operation aims at discharging the dark charge occurring in the pixels 37 through the signal lines 46.

The reset operation of the pixels 37 is carried out in, for example, a successive reset method, in which the pixels 37 are reset on a row-by-row basis. In the successive reset method, as shown in FIG. 3, the gate pulses G1 to Gn are successively issued from the gate driver 39 to the scan lines 44 to turn on the TFTs 43 of the pixels 37 on a row-by-row basis, as in the case of the readout operation of the signal charge. While the TFTs 43 of the single row are turned on, the dark charge flows from the pixels 37 through the signal lines 46 to integration amplifiers 47. In the reset operation, a multiplexer (MUX) 48 does not read the electric charge (voltage) accumulated in the integration amplifiers 47, in contrast to the readout operation. The electric charge accumulated in each integration amplifier 47 is discharged by turning on a reset switch 47a in response to a reset pulse RST issued in synchronization with each of the gate pulses G1 to Gn. Thereby, the integration amplifiers 47 are reset.

The signal processing section 40 is provided with the integration amplifiers 47, the MUX 48, and an A/D converter 49. The integration amplifiers 47 are connected to the signal lines 46 on a one-by-one basis. The integration amplifier 47 includes an operational amplifier and a capacitor connected between one of input terminals and an output terminal of the operational amplifier. One of the input terminals of the operational amplifier is connected to the signal line 46. The other one of the input terminals of the operational amplifier is connected to ground (GND). The integration amplifiers 47 integrate the electric charge inputted from the signal lines 46, and convert the electric charge into voltage signals (pixel signals) D1 to Dm. The output terminal of the integration amplifier 47 of each column is connected to the MUX 48 through another amplifier and a sample holder (neither is shown). The A/D converter 49 is connected to the MUX 48 on its output side.

The MUX 48 successively selects one of the integration amplifiers 47 connected in parallel, and inputs the voltage signals D1 to Dm, which are outputted from the selected integration amplifiers 47, to the A/D converter 49 in series. The A/D converter 49 converts the inputted voltage signals D1 to Dm into digital data, and outputs the digital data to a memory 51 contained in the case of the electronic cassette 21.

When the MUX 48 reads out the voltage signals D1 to Dm of one row from the integration amplifiers 47, the control section 41 outputs the reset pulse RST to the integration amplifiers 47 to turn on reset switches 47a. Thus, the signal charge of one row that is accumulated in the integration amplifiers 47 is released. After the reset of the integration amplifiers 47, the gate driver 39 outputs the gate pulse for the next row to start reading out the signal charge from the pixels 37 of the next row. By successively repeating this operation, the signal charge is read out from the pixels 37 of every row. Note that, this reset operation of the integration amplifiers 47 are different from the reset operation of the pixels 37 described above.

After the completion of the readout of the signal charge from every row, image data representing a single frame of the X-ray image is recorded to the memory 51. This image data is read out of the memory 51, and outputted to the imaging control unit 23 through the communication section 52 and the communication cable 25 (see FIG. 1). Thus, the X-ray image of a patient's body part is detected.

The irradiation detection operation is broadly divided into a first judgment step and a second judgment step. In the first judgment step, the gate driver 39 issues the gate pulses G1 to Gn at a time to every scan line 44 to turn on every TFT 43. A voltage signal obtained during that time is compared with a threshold value, and the start of X-ray irradiation is judged from a comparison result. In the second judgment step, every TFT 43 is turned off just as with the charge accumulation operation. A differential value of the voltage signal during that time is compared with another threshold value, and whether or not the judgment of the first judgment step is correct is verified from a comparison result.

Figure 4:
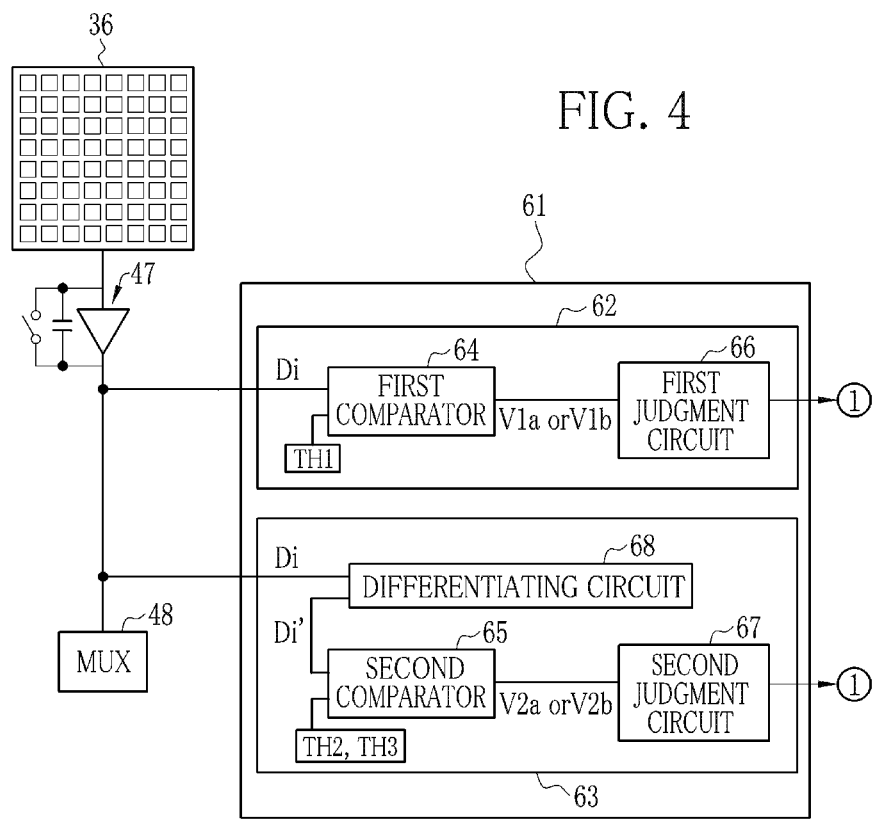
FIG. 4 is a schematic view of an irradiation detector for detecting the start of X-ray irradiation.

Referring to FIG. 4, in the irradiation detection operation, an irradiation detector 61 detects that the FPD 36 is irradiated with the X-rays from the X-ray source 13. The irradiation detector 61 is provided in the column of the pixels 37 arranged in the middle of the imaging area 38, for example. The reason why the pixels 37 arranged in the middle of the imaging area 38 are used for the detection of X-ray irradiation is because the pixels 37 in the middle of the imaging area 38 hardly goes out of an irradiation area of the X-rays, even if the irradiation area is set smaller than the imaging area 38 in accordance with the size of the body part to be imaged. Thus, it is possible to certainly detect the start of X-ray irradiation irrespective of the size of the irradiation area of the X-rays.

The irradiation detector 61 includes a first judgment unit 62 for carrying out the first judgment step, and a second judgment unit 63 for carrying out the second judgment step. The first judgment unit 62 has a first comparator 64 and a first judgment circuit 66. The second judgment unit 63 has a second comparator 65 and a second judgment circuit 67. In addition to that, the second judgment unit 63 has a differentiating circuit 68.

In the irradiation detection operation, the MUX 48 selects the column connected to the irradiation detector 61. The voltage signal (pixel signal) Di corresponding to the signal charge accumulated in the integration amplifier 47 of that column is inputted to each of the first and second judgment units 62 and 63.

Each of the first and second comparators 64 and 65 has two input terminals and one output terminal. An output of the integration amplifier 47, in other words, the voltage signal Di is inputted to one of the input terminals of the first comparator 64, and a first threshold value TH1 (see FIGS. 5(A) and 6(A)) is inputted to the other. The output terminal of the first comparator 64 is connected to the first judgment circuit 66. The first comparator 64 compares the voltage signal Di with the first threshold value TH1. The first comparator outputs a voltage value V1a when the voltage signal Di is less than the first threshold value TH1, and outputs a voltage value V1b when the voltage signal Di is equal to or more than the first threshold value TH1.

The first judgment circuit 66 monitors the voltage value from the output terminal of the first comparator 64. When the voltage value changes from V1a to V1b, in other words, when the voltage signal Di comes to be equal to or more than the first threshold value TH1, the first judgment circuit 66 judges that the X-ray irradiation has been started. Accordingly, the first judgment circuit 66 outputs an irradiation detection signal to the control section 41.

As shown in a first half of FIGS. 5(A) and 6(A), when the FPD 36 is not irradiated with the X-rays, only the dark charge occurs in the pixels 37. In this state, the voltage signal Di inputted to the first comparator 64 should be less than the first threshold value TH1. On the other hand, when the FPD 36 is irradiated with the X-rays, as shown in a latter half of FIG. 5(A), the signal charge occurs in the pixels 37 by an amount corresponding to the amount of the incident X-rays. Since the amount of the signal charge is much larger than that of the dark charge, the voltage signal Di exceeds the threshold value TH1 immediately after the start of X-ray irradiation. The voltage signal Di, which varies with time, is represented as a function of time f(t). The first judgment unit 62 monitors variation in the voltage signal Di between before and after the start of X-ray irradiation, and detects the start of X-ray irradiation.

The differentiating circuit 68 of the second judgment unit 63 performs first-order differentiation of the voltage signal Di, and inputs a first-order differential value Di' (f' (t)) to one of the input terminals of the second comparator 65. To the other input terminal of the second comparator 65, second and third threshold values TH2 and TH3 (see FIGS. 5(B) and 6(B)) are inputted. The second comparator 65 compares the first-order differential value Di' with the second and third threshold values TH2 and TH3. When the first-order differential value Di' is within a range defined by the second and third threshold values TH2 and TH3 (−TH3<Di'<TH2), the second comparator 65 outputs a voltage value V2a. When the first-order differential value Di' is out of the range (Di'≦− TH3 or Di'≧TH2), the second comparator 65 outputs a voltage value V2b.

The second judgment circuit 67 monitors a voltage value from the output terminal of the second comparator 65 for predetermined time (hereinafter called "verification period"). When the voltage value is kept at V2a or V2b over the verification period, in other words, when the first-order differential value Di' is kept within or out of the range defined by the second and third threshold values TH2 and TH3 without crossing the range throughout the verification period, the second judgment circuit 67 verifies that a judgment result of the first judgment unit 62 is correct, in other words, the X-ray irradiation by the X-ray source 13 has been actually started. Then, the second judgment unit 63 outputs a detection certification signal to the control section 41.

On the other hand, when the voltage value from the output terminal of the second comparator 65 fluctuates between V2a and V2b, in other words, when the first-order differential value Di' oscillates over the range defined by the second and third threshold values TH2 and TH3, the second judgment circuit 67 verifies that the judgment result of the first judgment unit 62 is incorrect. Then, the second judgment circuit 63 outputs a wrong detection notification signal to the control section 41.

During the irradiation detection operation, the electronic cassette 21 sometimes vibrate due to an impact made by a radiological technician or the patient H unintentionally bumping into the imaging support 22. In addition to that, there are many conceivable situations in which the vibration of the electronic cassette 21 occurs during the irradiation detection operation, for example, a case where the patient H holds the electronic cassette 21 by himself/herself for radiography, a case where the electronic cassette 21 is put on the patient H, a case where the radiography is performed in a car that sways whenever a person gets on or off, a case where a power generator is used as a power source outside a hospital, and the like.

As is widely known, when the electronic cassette 21 vibrates, vibration noise caused by the vibration affects the signal processing section 40, and noise is added to the voltage signal. The noise added to the voltage signal causes increase in the voltage signal Di outputted during the irradiation detection operation by a corresponding amount, as a matter of course. As a result, as shown in FIG. 6(A), the voltage signal Di exceeds the first threshold value TH1. Thereby, the first judgment unit 62 makes the wrong detection of X-ray irradiation, even though the FPD 36 is not irradiated with the X-rays in actual fact.

In FIG. 6(A), the voltage signal Di caused by the vibration noise varies with time, just as in the case of the presence of X-rays irradiation, namely just as with the voltage signal Di of FIG. 5. Thus, the voltage signal Di is represented as a function of time g(t). The function g(t) has a sinusoidal waveform with a constant period and a decayed amplitude, that is, a waveform of damped oscillation. The differentiating circuit 68 performs the first-order differentiation of the function g(t), and obtains a waveform g' (t) that is 90° out of phase with the function g(t), as shown in FIG. 6(B).

As shown in FIG. 5(B), the first-order differentiation f' (t) of the function f(t) sharply rises in response to the X-ray irradiation, and becomes constant in a short time. On the other hand, the first-order differentiation g' (t) of the function g(t) according to the vibration noise, as shown in FIG. 6(B), has the same waveform of the damped oscillation as that of the function g(t), though it is out of phase with the function g(t).

While the FPD 36 is actually irradiated with the X-rays, the first-order differentiation f' (t) is kept constant within or without the range defined by the second and third threshold values TH2 and TH3 (f' (t) is within the range in FIG. 5(A) and (B)). In the case of the waveform according to the vibration noise, on the other hand, the first-order differentiation g' (t) crosses over the range defined by the second and third threshold values TH2 and TH3 in the verification period, if the threshold values TH2 and TH3 take on appropriate values. This difference manifests itself in the output voltage of the second comparator 65. In the former case, the single voltage V2a or V2b is outputted throughout the verification period. In the latter case, the voltages V2a and V2b are alternately outputted in the verification period. As described above, the second judgment unit 63 can verify the judgment result of the first judgment unit 62, in other words, verify whether the first judgment unit 62 detects the actual X-ray irradiation or wrongly detects the vibration noise, by monitoring the fluctuation in the voltage signal Di with time after the first judgment unit 62 detects the variation in the voltage signal Di.

Thereby, even if the voltage signal Di exceeds the first threshold value TH1 by addition of the vibration noise, and the first judgment circuit 66 outputs the irradiation detection signal, the second judgment unit 63 judges it as the wrong detection. Thus, the second judgment circuit 67 outputs the wrong detection notification signal to the control section 41, and cancels the irradiation detection signal inputted before. Accordingly, the electronic cassette 21 has once made a transition to the charge accumulation operation after the wrong detection of the start of X-ray irradiation, but immediately interrupts the charge accumulation operation and continuously carries out the irradiation detection operation. Only when the X-ray irradiation is actually started, the detection certification signal is inputted to the control section 41, and the charge accumulation operation is continued.

Note that, the second and third threshold values TH2 and TH3 are set at values that the amplitude of the first-order differentiation of the voltage signal due to the vibration noise just exceeds. The vibration noise produces the voltage signal that exceeds the first threshold value TH1.

In this embodiment, every TFT 43 is turned off when the voltage signal Di is equal to or more than the first threshold value TH1, and the first judgment unit 62 outputs the irradiation detection signal. Until the first judgment unit 62 outputs the irradiation detection signal, every TFT 43 is turned on. Before the output of the irradiation detection signal, the voltage signal Di corresponds to the electric charge produced in the pixels 37. After the output of the irradiation detection signal, namely, when every TFT 43 is turned off, the voltage signal Di inputted to the second judgment unit 63 corresponds to the leak current that leaks from the pixels 37 to the signal line 46.

When every TFT 43 is turned off, a channel between the pixel 37 and the signal line 46 is closed. Thus, ideally, the electric charge accumulated in the pixels 37 does not flow into the signal lines 46. However, in actual fact, a small amount of electric charge accumulated in the pixels 37 leaks into the signal lines 46, even if the TFTs 43 are turned off. The amount of leak charge increases with increase in the amount of electric charge accumulated in the pixels 39, but is much smaller than the amount of signal charge produced in the pixels 37 by the X-ray irradiation. The vibration noise, however, is not accumulated in the pixels 37 but affects the signal processing circuit 40. For this reason, the vibration noise manifests itself as a relatively large value in the voltage signal Di that corresponds to the leak charge. Therefore, the validity of second judgment is secured if the TFTs 43 are turned off and the second judgment is performed based on the leak charge.

After the electronic cassette 21 is powered on, the control section 41 makes the FPD 36 perform the reset operation until the imaging conditions are sent from the imaging control unit 23. When the imaging conditions are sent from the imaging control unit 23, the FPD 36 transfers from the reset operation to the irradiation detection operation in which every TFT 43 is turned on. When receiving the irradiation detection signal from the irradiation detector 61 during the irradiation detection operation, the control section 41 makes the FPD 36 transfer from the irradiation detection operation to the charge accumulation operation.

The control section 41 continues the charge accumulation operation in the case of receiving the detection certification signal from the irradiation detector 61. In the case of receiving the wrong detection notification signal, on the other hand, the control section 41 makes every pixel 37 concurrently discharge the dark charge to reset every pixel 37 by inputting the gate pulses to every row, and then restarts the irradiation detection operation.

The control section 41 measures by a timer elapsed time from the start of the charge accumulation operation. When the elapsed time reaches a time set in the imaging conditions, the control section 41 makes the FPD 36 transfer from the charge accumulation operation to the readout operation.

The imaging control unit 23 is connected to the electronic cassette 21 with or without the communication cable 25, to control the operation of the electronic cassette 21. To be more specific, the imaging control unit 23 sends the imaging conditions to the electronic cassette 21 in order to set up signal processing conditions (gain of an amplifier and the like) of the FPD 36 and intermittently control the operation of the FPD 36. Also, the imaging control unit 23 sends the image data from the electronic cassette 21 to the console 24.

In FIG. 1, the imaging control unit 23 includes a CPU 23a for performing centralized control of the unit 23, a communicator 23b for establishing wired or wireless communication with the electronic cassette 21 and establishing communication with the console 24 via the cable 26, and a memory 23c. The communicator 23b and the memory 23c are connected to the CPU 23a. The memory 23c stores control programs to be executed by the CPU 23a, and various types of information including the first to third threshold values TH1 to TH3. The first to third threshold values TH1 to TH3 stored in the memory 23c are sent to the electronic cassette 21 through the communication cable 25 after turning on the electronic cassette 21. Then, the first threshold value TH1 is set as the input of the first comparator 64, and the second and third threshold values TH2 and TH3 are set as the input of the second comparator 65.

The console 24 sends the imaging conditions to the imaging control unit 23, and applies various types of image processing such as offset correction and gain correction to the X-ray image data sent from the imaging control unit 23. The X-ray image after being processed is displayed on a monitor of the console 24. This X-ray image data is also stored to a hard disk or a memory in the console 24 or a data storage device such as an image server connected to the console 24 over a network.

The console 24 receives input of an examination order including the sex and age of the patient H, the body part to be imaged, and the purpose of the examination, and displays the examination order on the monitor. The examination order is transferred from an external system such as HIS (hospital information system) or RIS (radiation information system) that manages patient information and examination information related to the radiography, or inputted manually by the radiological technician. The radiological technician confirms the contents of the examination order on the monitor, and inputs on an operation screen of the console 24 the imaging conditions in accordance with the contents.

Next, the operation of the X-ray imaging system 10 having above structure will be hereinafter described with referring to timing charts of FIGS. 7 and 8 and a flowchart of FIG. 9. In FIGS. 7 to 9, each of reference numerals S10 to S21 represents a common operation step.

When the radiography is performed with the X-ray imaging system 10, the height of the electronic cassette 21 set on the imaging support 22 is adjusted in accordance with the position of the patient's body part to be imaged. Also, the height of the X-ray source 13 and the size of the irradiation field are adjusted in accordance with the height of the electronic cassette 21 and the size of the body part to be imaged.

Next, as shown in a step S10 of FIG. 9, the electronic cassette 21 is powered on. At this time, the bias voltage is applied from a power source to the pixels 37 of the FPD 36. The gate driver 39 and the signal processing section 40 are actuated, and the control section 41 makes the FPD 36 perform the reset operation (S11). Then, the imaging conditions are inputted from the console 24, and the imaging conditions are set up in the electronic cassette 21 via the imaging control unit 23. The imaging conditions are also set up in the source control unit 14. Upon receiving the imaging conditions from the imaging control unit 23 (YES in S12), the control section 41 makes the FPD 36 transfer from the reset operation to the irradiation detection operation (S13).

When preparation for radiography as described above is completed, the radiological technician gives the first-step push of the irradiation switch 15. Thus, the warm-up start signal is sent to the source control unit 14, to start warming the X-ray source 13 up. After a lapse of predetermined time, the radiological technician gives the second-step push of the irradiation switch 15. Thus, the irradiation start signal is sent to the source control unit 14 to start the X-ray irradiation.

In the irradiation detection operation, all TFTs 43 are turned on. The voltage signal Di is readout from the integration amplifiers 47 at regular intervals, and the integration amplifiers 47 are reset, as in the case of the readout operation. The voltage signal Di is inputted to the first comparator 64 of the first judgment unit 62 and compared with the first threshold value TH1 to detect the start of X-ray irradiation. Note that, in a case where the start of X-ray irradiation is not detected if the irradiation detection operation is continued for predetermined time, the control section 41 returns the FPD 36 to the step S11 of the reset operation (not shown in FIG. 9).

When the voltage signal Di is equal to or more than the first threshold value TH1, and the first judgment circuit 66 detects that the output of the first comparator 64 has varied to V1$b$ (detects the start of X-ray irradiation; YES in S14), the irradiation detection signal is outputted from the first judgment unit 62 to the control section 41. Upon receiving the irradiation detection signal, the control section 41 turns off all the TFTs 43, and starts the charge accumulation operation for capturing the X-ray image (S15, S18).

In the second judgment unit 63, the differentiating circuit 68 performs the first-order differentiation of the voltage signal Di that corresponds to the leak charge leaking from the pixels 37 to the signal line 46. Then, the second comparator 65 compares the first-order differentiation value Di' of the voltage signal Di with the second and third threshold values TH2 and TH3, in order to verify whether or not the judgment of the first judgment unit 62 is correct.

When the first-order differentiation value Di' is within or out of the range defined by the second and third threshold values TH2 and TH3 throughout the verification period, and the second judgment circuit 67 detects that the output of the second comparator 65 is V2$a$ or V2$b$ (the judgment of the first judgment unit 62 is correct; YES in S16), the second judgment circuit 67 outputs the detection certification signal to the control section 41 (S17). In this case, the state of S15 in which all the TFTs 43 are turned off, in other words, the charge accumulation operation for capturing the X-ray image is continued (S18). During the charge accumulation operation, the X-rays transmitted through the patient's body part to be imaged is incident on the imaging area 38 of the FPD 36, and the signal charge is accumulated in the pixels 37 by an amount corresponding to the amount of the incident X-rays.

The source control unit 14 stops the X-ray irradiation after a lapse of irradiation time set up in the imaging conditions. After a lapse of predetermined time corresponding to the irradiation time set up in the imaging conditions (YES in S19), the FPD 36 completes the charge accumulation operation and shifts to the readout operation of the X-ray image (S20). In the readout operation, the signal charge accumulated in the pixels 37 is successively read out from a first row on a row-by-row basis, and a single frame of X-ray image data is recorded in the memory 51. The image data is sent to the console 24 through the imaging control unit 23. After the readout operation, the FPD 36 returns to a state just after the power-on (the reset operation), when the next imaging conditions have not been set up. The FPD 36 returns to S13 and restarts the irradiation detection operation, when the next imaging conditions have been set up.

On the other hand, when the second judgment circuit 67 detects that the first-order differentiation value Di' oscillates over the range defined by the second and third threshold values TH2 and TH3 in the verification period and the output of the second comparator 65 fluctuates between V2$a$ and V2$b$ (the judgment of the first judgment unit 62 is incorrect; NO in S16), the wrong detection notification signal is outputted from the second judgment circuit 67 to the control section 41 (S21). In this case, the control section 41 interrupts the charge accumulation operation of the FPD 36 (S21). The control section 41 makes the FPD 36 reset all the pixels (not shown in FIGS. 8 and 9), and then restart the irradiation detection operation of S13. Note that, the first-order differentiation value Di' crosses over the range defined by the second and third threshold values TH2 and TH3 just once in this embodiment, but it can happen plural times during the irradiation detection operation. In this case, whenever the first-order differentiation value Di' crosses over the range, the wrong detection notification signal is outputted to cancel the irradiation detection signal.

As described above, according to the present invention, whether or not the detection of the start of X-ray irradiation is caused by the vibration of the electronic cassette 21 is verified based on the fluctuation in the voltage signal Di with time. If the detection is caused by the vibration, the judgment of the start of X-ray irradiation is canceled. Thus, it is possible to certainly prevent the wrong detection of the start of X-ray irradiation. Accordingly, the electronic cassette 21 does not need to perform useless operation due to the wrong detection, and does not miss a perfect shooting opportunity. This improves efficiency of the radiography, and saves waste electric power.

Since the start of X-ray irradiation is detected by two steps including the first and second judgment steps, the criterion of the first judgment step can be relatively loose (the first threshold value TH1 of the first judgment step is set at a low value). In this case, the voltage signal Di exceeds the first threshold value TH1 immediately after the start of X-ray irradiation, and the FPD 36 starts the charge accumulation operation. Thus, it is possible to reduce the amount of X-rays that contribute the detection of the start of X-ray irradiation but does not contribute the formation of the X-ray image, and reduce waste exposure of the patient H to radiation.

Since the first judgment step is carried out in a state of turning on all the TFTs 43, the voltage signal Di obtained in the first judgment step is larger than that in monitoring the leak charge with turning off the TFTs 43. The larger voltage signal Di is easily compared with the first threshold value TH1, resulting in correct judgment. The vibration noise manifests itself as a relatively large value in the voltage signal Di converted from the leak charge. Thus, if all the TFTs 43 are turned off and the leak charge is monitored in the second judgment step, it is easy to make a distinction between the actual X-ray irradiation and the vibration noise. Note that, in the first judgment step, all the TFTs 43 may be turned off and the leak charge may be monitored.

Upon the output of the irradiation detection signal from the first judgment unit 62, all the TFTs 43 are turned off (shift to the charge accumulation operation) and the leak charge is monitored to perform the second judgment step. Thus, it is possible to carry out the second judgment step in a short time, as compared with a case where the gate pulses are successively inputted for the readout operation and the second judgment is performed based on the output of the readout operation. The vibration noise sometimes attenuates within several milliseconds. If the second judgment takes long time, the second judgment may be carried out after the vibration subsides. This may cause confusion with correct detection. However, reduction of time required for the second judgment prevents this problem. Note that, it is preferable that time of the verification period from the completion of the first judgment to the completion of the second judgment is less than 3 milliseconds, for example, to detect the vibration attenuating within several milliseconds.

The X-rays that are applied between the output of the irradiation detection signal and the output of the detection certification signal are efficiently used for the formation of the X-ray image. Furthermore, since all the TFTs are turned on before the shift to the charge accumulation operation, the dark charge occurring regardless of the presence or absence of X-ray irradiation is naturally discharged and the noise caused by the dark charge is removed. Therefore, the quality of the X-ray image is improved.

Since the irradiation detection operation is restarted immediately after the judgment of the wrong detection, the actual X-ray irradiation can be detected without fail.

To increase the accuracy of the verification by the second judgment unit 63, the ratio Di'/Di between the voltage signal Di and the first-order differentiation value Di' may be compared with a fourth threshold value TH4, in addition to the comparison between the first-order differentiation value Di' and the second and third threshold values TH2 and TH3. When the magnitude relation between the ratio Di'/Di and the fourth threshold value TH4 is varied with time, the detection may be judged to be the wrong detection caused by the vibration noise. In this case, there are provided a division circuit for calculating the ratio Di'/Di from the output of the integration amplifier 47 and the output of the differentiating circuit 68, a comparator for comparing the output of the division circuit with the fourth threshold value TH4, and a judgment circuit for monitoring output voltage of the comparator. When the amount of the X-rays is minute, it is difficult to verify the first judgment result only from the comparison between the first-order differentiation value Di' and the second and third threshold values TH2 and TH3. Performing the comparison between the ratio Di'/Di and the fourth threshold value TH4, in addition to the comparison between the first-order differentiation value Di' and the second and third threshold values TH2 and TH3, improves the reliability of the second judgment.

In the above embodiment, the second judgment is performed using the first-order differentiation value Di' of the voltage signal Di, but a second-order differentiation value Di" may be used instead of or in addition to the first-order differentiation value Di'. In FIG. 5(C), a second-order differentiation value Di" (f"(t)) of the voltage signal Di in the case of the actual X-ray irradiation is similar to a gauss function. On the other hand, a second-order differentiation value Di" (g"(t)) of the vibration noise is just out of phase with the voltage signal Di, as with the first-order differentiation value Di' (g'(t)), as shown in FIG. 6(C).

In using the second-order differentiation value Di" instead of the first-order differentiation value Di', the differentiating circuit 68 performs second-order differentiation of the voltage signal Di to output the second-order differentiation value Di". When the second-order differentiation value Di" is within a range defined by fifth and sixth threshold values TH5 and TH6 (−TH6<Di"<TH5), the second comparator 65 outputs a voltage value V3a. When the second-order differentiation value Di' is out of the range (Di"≦−TH6 or Di"≧TH5), the second comparator 65 outputs a voltage value V3b. When V3a is outputted from the second comparator 65 throughout the verification period, the second judgment circuit 67 outputs the detection certification signal to the control section 41. When V3a and V3b are alternately outputted, the second judgment circuit 67 outputs the wrong detection notification signal to the control section 41. Later steps are the same as those of the above embodiment. Note that, the fifth and sixth threshold values TH5 and TH6 take on appropriate values, as with the second and third threshold values TH2 and TH3. For example, TH6 is set at TH5/2.

In the case of using both the first-order differentiation value Di' and the second-order differentiation value Di", two judgment units for the first-order differentiation value Di' and the second-order differentiation value Di" are provided. Only when both the two judgment units output the detection certification signal, the judgment of the first judgment unit 62 is verified to be correct. When either of the two judgment units outputs the wrong detection notification signal, the judgment of the first judgment unit 62 is verified to be incorrect. In another case, only when both the two judgment units output the wrong detection notification signal, the judgment of the first judgment unit 62 may be verified to be incorrect.

The monotonously increasing function f(t) approaches zero with increase in the number of order of differentiation. On the other hand, the function g(t) of a sinusoidal wave is just out of phase with repetition of the differentiation, and its amplitude does not change. For this reason, by using the second differentiation value Di" for the verification, the actual X-ray irradiation and the vibration noise can be clearly distinguished, and the wrong detection can be prevented in certain. Note that, if the number of order of the differentiation is too high, the verification timing becomes too late and the second judgment is performed after the vibration noise subsides. Thus, the second-order differentiation is appropriate.

The second judgment can be performed without using the differentiating circuit 68. In the verification period, the voltage signal Di is compared with a seventh threshold value TH7 at constant sampling intervals. When the voltage signal Di is equal to or more than the seventh threshold value TH7 at every point in time, the actual X-ray irradiation is verified. In the case of the actual X-ray irradiation, the voltage signal Di increases monotonously. However, in the case of the vibration noise, the voltage signal Di oscillates with respect to a vibration center, and hence does not become equal to or more than the seventh threshold value TH7 at every point. Taking advantage of this property, the vibration noise can be distinguished from the actual X-ray irradiation. The nonuse of the differentiating circuit can shorten the judgment time, and reduce cost.

In the above embodiment, the pixel signals used for detecting the X-ray irradiation are taken out of the pixels 37 of the single column in the middle of the imaging area 38. However, the pixel signals of plural or all columns may be used to detect the X-ray irradiation. In such a case, the adjoining four to eight columns are made in groups by a unit of ASIC composing the signal processing section 40, and a simple average of the voltage signals Di in each group or an average of the voltage signals Di exclusive of maximum and minimum values may be used for the judgment. Using the plural columns instead of the single column allows improvement in the detection accuracy.

In the above embodiment, the analog voltage signal outputted from the integration amplifier 47 is compared with the threshold value to detect the X-ray irradiation, but instead, a digitized voltage signal after the A/D conversion may be compared with a threshold value.

The X-ray imaging system 10 is not limited to a type of being installed in a radiography room, but may be of a type installed in a vehicle, or of a portable type in which the X-ray source 13, the source control unit 14, the electronic cassette 21, the imaging control unit 23, and the like are carried into an accident or natural disaster scene requiring emergency medical treatment or the bedside of a home-care patient for the radiography. The X-ray imaging system of the type installed in the vehicle or the portable type easily and frequently receives an impact as compared with that of the type installed in the radiography room, so applying the present invention to the X-ray imaging system of such type achieves considerable effect.

Instead of sequential reset operation for sequentially resetting the pixels of all the rows as described in the above embodiment, parallel reset operation may be performed. In the parallel reset operation, the plural rows are made into a group and the sequential reset operation may be performed on all the pixels on a group-by-group basis. In this case, the dark charge is concurrently discharged from the rows of all the groups. By using the parallel reset operation, the reset operation is accelerated.

There are several types of X-ray sources that eliminate the need for the warm-up, such as a fixed anode type having a non-rotating anode, a cold cathode type being in no need of preheating. Thus, the irradiation switch may only have the function of issuing the irradiation start signal. Even in the case of the X-ray source requiring the warm-up, the irradiation switch inputs the irradiation start signal to the source control unit, and the source control unit may start the warm-up in response to the irradiation start signal. After the completion of the warm-up, the X-ray irradiation may be automatically started. In this case, the irradiation switch does not need to have the function of issuing the warm-up start signal.

In the above embodiment, the electronic cassette and the imaging control unit are configured separately, but the electronic cassette and the imaging control unit may be integrated by, for example, providing the function of the imaging control unit to the control section of the electronic cassette. Instead of the console, the imaging control unit may carry out the image processing.

In the above embodiment, the present invention is applied to the electronic cassette being a portable X-ray image detecting device, but may be applied to a fixed X-ray image detecting device.

The present invention is applicable to an imaging system using another type of radiation such as y-rays, in addition to the X-rays.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device comprising:
a radiation image detector having a plurality of pixels, each of said pixels accumulating signal charge by an amount corresponding to an amount of radiation incident from a radiation source, each of said pixels being provided with a switching element for outputting said signal charge, said outputted signal charge being converted into an electric signal;
a first judgment unit for judging whether or not radiation irradiation has been started based on variation of said electric signal, said variation being detected by comparing said electric signal from at least one of said pixels with a first threshold value at predetermined time intervals;
a second judgment unit for checking whether or not said variation of said electric signal is actually caused by said radiation irradiation based on fluctuation of said electric signal with time after said first judgment unit judges that said radiation irradiation has been started, to verify whether or not a judgment of said first judgment unit is correct; and
a control section for controlling operation of said radiation image detector in accordance with a judgment result of said first judgment unit and a verification result of said second judgment unit.

2. The radiation image detecting device according to claim 1,
wherein said control section starts charge accumulation operation of said radiation image detector, after said first judgment unit judges that said radiation irradiation has been started;
wherein if said second judgment unit verifies that said judgment of said first judgment unit is correct, said control section continues said charge accumulation operation of said radiation image detector; and
wherein if said second judgment unit verifies that said judgment of said first judgment unit is incorrect, said control section interrupts said charge accumulation operation of said radiation image detector, and restarts said judgment of said first judgment unit.

3. The radiation image detecting device according to claim 1, wherein during said judgment of said first judgment unit, said control section turns on all of said switching elements.

4. The radiation image detecting device according to claim 1,
wherein when said first judgment unit judges that said radiation irradiation has been started, said control section turns off all of said switching elements; and
wherein said second judgment unit carries out said verification based on leak charge leaking from said pixel in an off state.

5. The radiation image detecting device according to claim 1, wherein said second judgment unit compares said electric signal with a second threshold value several times during a predetermined period after said first judgment unit judges that said radiation irradiation has been started, and makes a verification based on a comparison result.

6. The radiation image detecting device according to claim 1, wherein said second judgment unit has a differentiating circuit, and makes a verification based on a result of comparison between a differentiation value of said electric signal and a second threshold value.

7. The radiation image detecting device according to claim 6, wherein said second judgment unit makes said verification based on a result of comparing a ratio between said electric signal and said differentiation value of said electric signal with said second threshold value.

8. The radiation image detecting device according to claim 6, wherein said differentiating circuit performs first-order or second-order differentiation of said electric signal.

9. The radiation image detecting device according to claim 1, wherein said first and second judgment units use said electric signal outputted from said pixel in a middle of said radiation image detector for said judgment and said verification.

10. The radiation image detecting device according to claim 1 being an electric cassette having said radiation image detector contained in a case.

11. A control method of a radiation image detecting device, said radiation image detecting device including a radiation image detector having a plurality of pixels, each of said pixels accumulating signal charge by an amount corresponding to an amount of radiation incident from a radiation source, said signal charge outputted from each of said pixels being converted into an electric signal, said control method comprising the steps of;
judging whether or not radiation irradiation has been started by a first judgment unit based on variation of said electric signal, said variation being detected by comparing said electric signal from at least one of said pixels with a first threshold value at predetermined time intervals;

if said first judgment unit judges that said radiation irradiation has been started, starting charge accumulation operation of said radiation image detector;

checking whether or not said variation of said electric signal is actually caused by said radiation irradiation by a second judgment unit based on fluctuation of said electric signal with time after said first judgment unit judges that said radiation irradiation has been started, to verify whether or not said judgment of said first judgment unit is correct;

if said second judgment unit verifies that said judgment of said first judgment unit is correct, continuing said charge accumulation operation of said radiation image detector; and if said second judgment unit verifies that said judgment of said first judgment unit is incorrect, interrupting said charge accumulation operation of said radiation image detector, and restarting said judgment of said first judgment unit.

* * * * *